United States Patent [19]

Podgorski

[11] Patent Number: 5,127,016
[45] Date of Patent: Jun. 30, 1992

[54] LIFE EXTENDING GAS CAPSULE FOR RING LASER GYROSCOPE

[75] Inventor: Theodore J. Podgorski, Maplewood, Minn.

[73] Assignee: Honeywell Inc., Minneapolis, Minn.

[21] Appl. No.: 427,544

[22] Filed: Oct. 27, 1989

[51] Int. Cl.$^5$ .............................................. H01S 3/22
[52] U.S. Cl. ........................................ 372/59; 372/94; 315/110
[58] Field of Search ....................... 372/59, 61, 55, 94; 313/545, 547; 315/110

[56] References Cited

U.S. PATENT DOCUMENTS

| | | | |
|---|---|---|---|
| 3,390,606 | 7/1978 | Podgorski | 372/94 |
| 3,641,455 | 2/1972 | Matovich | 372/59 |
| 3,876,957 | 4/1975 | Thatcher | 372/59 |
| 4,257,015 | 3/1981 | Ljung | 372/94 |
| 4,481,635 | 11/1984 | Broberg et al. | 372/94 |
| 4,740,985 | 4/1988 | Podgorski | 372/59 |

FOREIGN PATENT DOCUMENTS

2904409 8/1979 Fed. Rep. of Germany ........ 372/59

Primary Examiner—Frank Gonzalez
Assistant Examiner—Susan S. Morse
Attorney, Agent, or Firm—Robert A. Pajak

[57] ABSTRACT

The life expectancy of a ring laser gyroscope has been greatly extended by the addition of a gas capsule (24) which holds a large quantity of lasing gas at high pressure in a very small volume. The gas is selectively admitted to the triangular tunnel (12) through a membrane (32). In a preferred embodiment, permeability of the membrane (32) varies with temperature and a platinum heating element (36) is deposited on the membrane (32) for the purpose of regulating the diffusion of the lasing gas through the membrane. A pressure sensor (44) is connected to the triangular tunnel (12) for sensing a decrease in lasing gas pressure therein. A servo control (46) utilizes information supplied by the pressure sensor (44) to regulate the energization of the heating element (36). In one arrangement, a silicon substrate (50) is common to both the pressure sensor (46) and the gas capsule (24). In a second embodiment of the invention, permeability of the membrane (60) is continuous and uncontrolled wherein regulation of the diffusion rate is achieved by controlling the composition and dimensions of the membrane (210 or 212).

42 Claims, 4 Drawing Sheets

LIFE EXTENDING GAS CAPSULE FOR RING LASER GYROSCOPE

FIELD OF THE INVENTION

The present invention generally relates to gas laser angular rate sensors, also known as ring laser gyroscopes, and, more particularly, to a life extending gas capsule for use with ring laser gyroscopes which replenishes gas lost from the laser cavity. While the invention has particular application to ring laser gyroscopes, it may be used with advantage with gas lasers and other gas discharge devices requiring replenishment of gas.

DESCRIPTION OF THE PRIOR ART

Ring laser gyroscopes typically comprise a glass-ceramic block having a polygonal tunnel therein which contains a lasing gas. Cavities containing electrodes for igniting the gas are connected to the tunnel. Current between the anode and cathode ignites the lasing gas and generates two laser beams having the same frequency which travel in opposite directions. Mirrors at the apices of the polygonal tunnel direct the laser beams to travel in opposite directions through the tunnel. A frequency difference will arise between the laser beam travelling in the same direction as the apparatus on which the ring laser gyroscope is mounted and the oppositely travelling laser beam if the apparatus rotates. This frequency differential is measured by sensors connected to the tunnel and is proportional to the rate of rotation of the apparatus.

A significant problem that has been encountered with ring laser gyroscopes is that the cathode acts as a gas pump and, through direct burial and sputtering, cleans up the gas until the pressure in the polygonal tunnel drops to a point where the discharge can no longer be sustained. As laser gyroscopes are made smaller, their lifetime typically becomes shorter because the gas volume decreases.

U.S. Pat. No. 3,390,606 to Podgorski discloses a ring laser gyroscope which includes a large cavity formed in the center of a fused quartz block which acts as a reservoir for lasing gas. The reservoir is directly connected to the triangular tunnel in which the laser beams propagate. The reservoir assures a longer operational life for the laser than if only the triangular tunnel was filled with lasing gas.

The size of the podgorski ring laser gyroscope makes it impractical for today's environments which demand a much smaller gyroscope. The Podgorski reservoir would not be used on smaller gyroscopes since its life extending properties correspond to its size. The Podgorski reservoir is connected directly to the triangular tunnel in the fused quartz block; therefore, the gas in the reservoir must necessarily have the same pressure as the gas in the triangular tunnel. In order to double the life of the Podgorski ring laser gyroscope, a reservoir which has the same volume as the triangular tunnel would be necessary.

Selectively permeable membranes are known in the oxygen sensor art. Honeywell, Inc. of Minneapolis, Minn., is developing a microstructure oxygen sensor that includes a zirconia membrane on which is deposited a thin film platinum heater. Oxygen can bleed through the zirconia membrane when the heater raises the temperature of the membrane. Oxygen is prevented from passing therethrough at lower temperatures. Until the invention thereof by the applicant, controllable, selectively permeable membranes have not been used in a laser environment.

SUMMARY OF THE INVENTION

It is therefore an object of this invention to provide a miniature gas laser gyroscope with an extended lifetime.

It is another object of this invention to provide a gas discharge device for selectively admitting gas into an enclosed cavity such as the polygonal tunnel in a ring laser gyroscope.

It is yet another object of this invention to provide a device for replenishing lasing gas in the polygonal tunnel of a ring laser gyroscope under servo control.

According to the invention, a capsule which stores high pressure helium (He) and neon (Ne) gas acts as a reservoir of lasing gas for a ring laser gyroscope. The capsule is connected to the polygonal tunnel in the ring laser gyroscope; however, a selectively permeable membrane prevents the free transfer of gas from the capsule to the polygonal tunnel. The selectively permeable membrane comprises a silicon nitride film, silicon dioxide film, soda lime glass film, or other suitable material positioned on a silicon substrate. In a preferred embodiment, a platinum heating element is deposited on the membrane for the purpose of controlling the diffusion of gas through the membrane. The membrane material has negligible permeability until it is heated to a particular temperature. Once heated, gases diffuse through the membrane into the gyroscope, thereby replenishing gas which has been cleaned up by the cathode. In another embodiment, the gas continuously diffuses through the membrane at a rate which is equivalent to the average rate of loss of lasing gas in the gyroscope.

The He-Ne gas mixture is stored at high pressure in the capsule so that when the membrane becomes permeable, the diffusion will be forced in the direction of the gas capsule into the polygonal tunnel. High pressure also allows a larger quantity of gas to be available in a smaller volume and, hence, the life extending property of the gas capsule is greatly increased by the larger quantity of lasing gas available for use in the laser. The He-Ne gas mixture is preferably rich in N because the cathode preferentially cleans up Ne and because Ne is slower to permeate the diaphragm.

In the preferred embodiment, the platinum heating element on the selectively permeable membrane is part of a servo-loop which is used to detect when and how much gas needs to be added to the polygonal tunnel in the ring laser gyroscope. The pressure in the polygonal tunnel is monitored and is indicative of the concentration of He and Ne gas therein. When the pressure in the polygonal tunnel drops to a predetermined threshold, current is conducted through the platinum heating element to heat it, thereby allowing the He-Ne gas mixture to diffuse into the tunnel. A temperature correction means is included in the servo-loop to compensate for temperature. The temperature correction means is provided since pressure is dependent on temperature. The pressure monitoring function can be fulfilled by a piezoresistive element fabricated on the same silicon substrate as the selectively permeable membrane, or by any other pressure sensor which is positioned to detect the pressure in the polygonal tunnel.

BRIEF DESCRIPTION OF THE DRAWINGS

The foregoing and other objects, aspects and advantages will be better understood from the following detailed description of the preferred embodiment of the invention with reference to the drawings, in which.

DETAILED DESCRIPTION OF THE PREFERRED EMBODIMENTS

Figure 1:
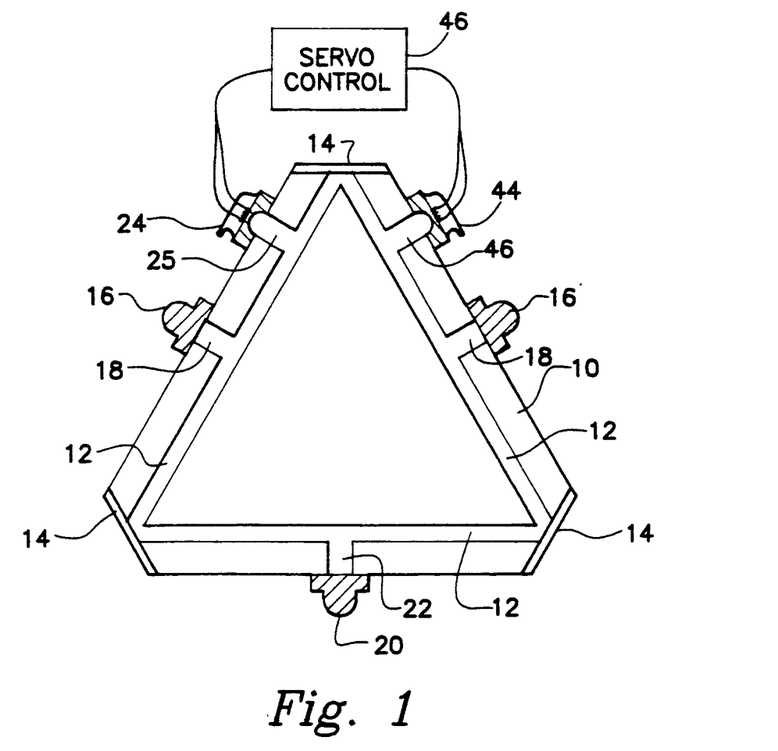
FIG. 1 is a plan view of a ring laser gyroscope in accordance with the first embodiment of the invention where a life extending gas capsule and a pressure sensor are mounted on the gyroscope and a servo control loop controls the replenishment of lasing gas.

Referring now to the drawings, and more particularly to FIG. 1, there is shown a ring laser gyroscope block 10 having a triangular tunnel 12 therein with mirrors 14 at the apices of the triangular tunnel 12. A pair of anodes 16 are connected to two of the sides of the triangular tunnel 12 via cavities 18, and a cathode 20 is connected to the remaining side of the triangular tunnel 12 via cavity 22. The anodes 16 and cathode 20 are connected to a source of current [not shown] which permits energizing the lasing gas held within the triangular tunnel 12. A life extending gas capsule 24 contains a lasing gas mixture under pressure and selectively admits the gas into the triangular tunnel 12 via cavity 25 as the cathode 20 cleans up the lasing gas, thereby increasing the life of the ring laser gyroscope.

Figure 2:
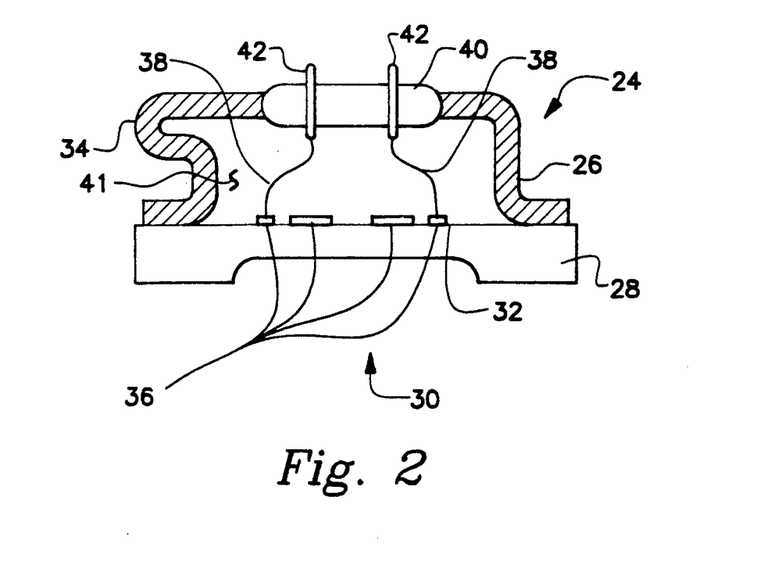
FIG. 2 is a cross-sectional view of the life extending gas capsule shown in FIG. 1.

FIG. 2 shows the life extending gas capsule 24 comprising a metal can 26 fitted over a silicon substrate 28 which has a membrane area 30 formed therein. The cavity surrounded by the metal can 26 and membrane 32 forms a gas reservoir portion 41 of the gas capsule 24. The membrane area 30 on the side of membrane 32 opposite the reservoir portion 41 serves as an exit port for the gas contained in the gas reservoir portion 41 of the gas capsule 24.

The membrane 32 can be silicon nitride, silicon dioxide, soda lime glass, or any other material which has a regulatable permeability. The membrane area 30 can be created by silicon etchback of the substrate 28 to a membrane layer 32 which has been formed on the silicon substrate 28 and can be modified by techniques well known in the silicon industry to adjust permeability. The metal can 26 includes a fill and pinch tube 34 that allows evacuating and filling the capsule 24 with lasing gas. The lasing gas is preferably a helium (He) and neon (Ne) mixture which is rich in Ne. In a preferred embodiment, the capsule contains one half cubic centimeter of He:Ne gas at two atmospheres of pressure, which is approximately $44*10^{-5}$ moles of gas. A platinum heating element 36 is fabricated on the membrane 32. The platinum heating element 36 is electrically connected to a source of current (not shown) via leads 38 and electrical feed throughs 42 which pass through header 40.

Referring to both FIGS. 1 and 2, the membrane 32 is chosen to selectively admit lasing gas from the capsule 24 into the triangular tunnel 12. In a preferred embodiment, the membrane 32 has a very low permeability at low temperatures and an extremely high permeability at high temperatures. The platinum heating element 36 is fabricated on the membrane 32 to achieve a heat transfer relationship that allows the lasing gas to permeate through the membrane 32.

Figure 3:
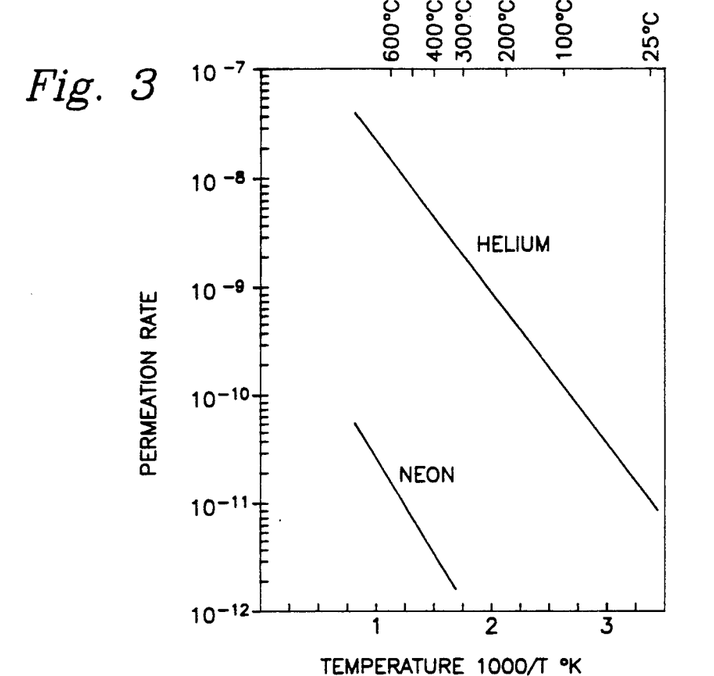
FIG. 3 is a graph of the permeation behavior of helium and neon through silicon dioxide.
Figure 4:
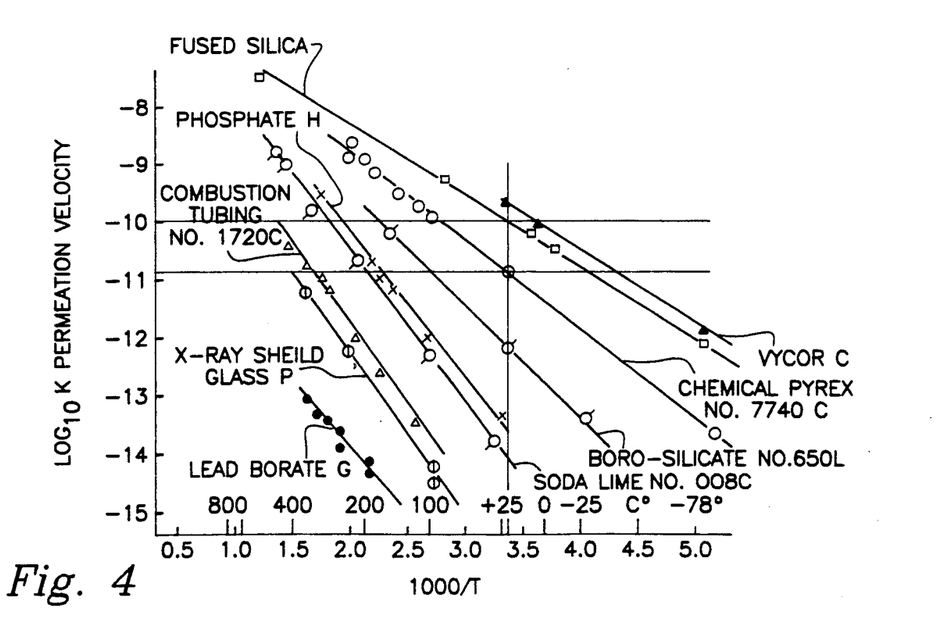
FIG. 4 is a graph of the permeation velocity, K, of helium diffusing through a variety of different glasses.

FIGS. 3 and 4 show that the permeation through the membrane 32 and variation of permeation with temperature can be adjusted by varying the dimensions and the material composition of the membrane 32. Silicon dioxide ($SiO_2$) and silicon nitride ($Si_3N_4$) are examples of two materials that can be sputtered onto a silicon substrate and used for the membrane 32. FIG. 3 shows the permeation behavior of helium and neon through $SiO_2$. As temperature is increased, helium and neon permeate silicon dioxide at an increasing rate. Silicon dioxide is more permeable to helium than neon. If the ratio of hot and cold permeation is not adequate, glass formers such as $Al_2O_3$, $CaO$, $MgO$, $Na_2O$, and $K_2O$ can be added to the $SiO_2$ to modify the permeation rate. FIG. 4 shows that soda lime glass, which is produced by adding the correct proportions of glass formers to $SiO_2$, has a much greater permeation rate change over temperature than pure $SiO_2$ (fused silica).

A soda lime glass membrane can be formed by direct sputtering of this glass onto the silicon substrate. Other glass membranes may be similarly sputtered. Other techniques can also be used to modify $SiO_2$ and $Si_3N_4$ membranes. For example, $SiO_2$ or $Si_3N_4$ targets can be simultaneously sputtered along with other metal or oxide targets to form the appropriate membrane composition. In addition, ion implantation can be used to implant metal ions into previously sputtered membranes. The metal ions can be diffused into the membrane by heating subsequent to implantation.

Referring back to FIG. 1, a pressure sensor 44 is connected via cavity 46 to the triangular tunnel 12 to monitor the ga pressure therein. As the lasing gas is cleaned up by the cathode 20, the pressure in the triangular tunnel 12 can drop to a point which will not sustain the laser discharge. The signal from the pressure sensor 44 is input into a servo control 46 which sends current to the platinum heating element 36 when additional lasing gas is required in the triangular tunnel 44 to sustain the discharge. The selective heating of the membrane 32 achieved by the servo control 46 is performed in accordance with upper and lower threshold pressures for the triangular tunnel 12. In a preferred embodiment, the gas pressure in the triangular tunnel 12 should not exceed seven Torr, and gas should be added to the triangular tunnel via heating the membrane 32 in the gas capsule 24 when the gas pressure in the triangular tunnel 12 drops to six Torr. In addition, the servo loop 46 includes temperature correction circuitry. The temperature correction circuitry is needed because of the physical relationship between temperature and pressure.

Figure 5:
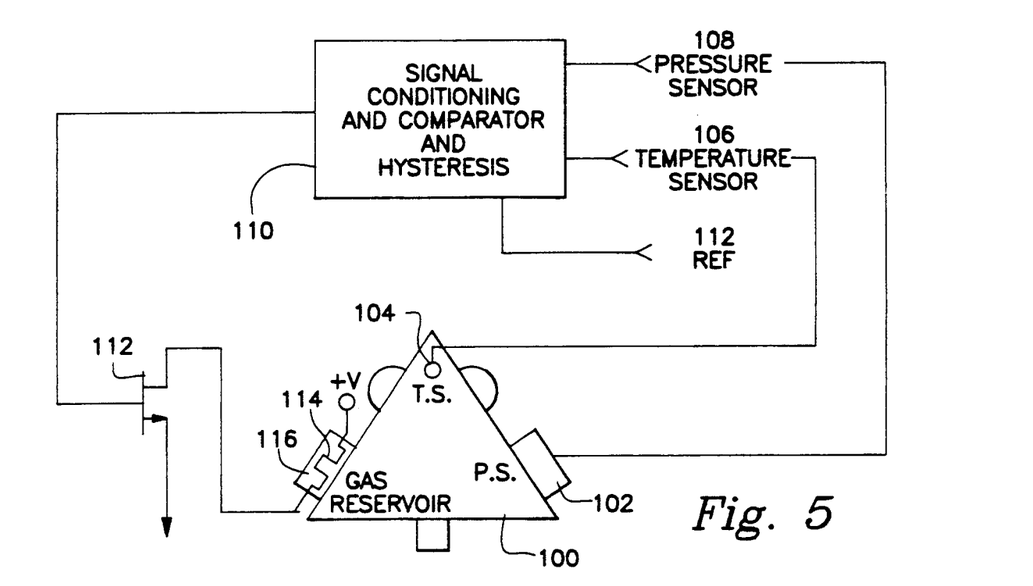
FIG. 5 is a schematic diagram of a servo-loop for regulating the addition of He-Ne gas from a life extending gas capsule into a ring laser gyroscope.

FIG. 5 shows a schematic diagram of the servo-loop used to regulate the addition of He-Ne gas from a gas capsule into a laser gyroscope. The internal cavity pressure and temperature of gyro block 100 are sensed using pressure and temperature sensors 102 and 104, respectively. The pressure sensor 102 and temperature sensor 104 are in direct contact with the gas held within a cavity in block 100. The sensors 102 and 104 send signals 106 and 108, respectively, to circuitry 110 which performs signal conditioning and comparator functions. The temperature signal 106 is conditioned by comparison with a voltage reference 112. The conditioned temperature signal is combined with pressure signal 108 to compensate for temperature effects on cavity pressure and directed to a voltage comparator 110 with hysteresis. The voltage comparator 110 output turns on transistor switch 112 when the gas pressure in the cavity falls below a threshold value, i.e., falls to six Torr. When transistor switch 112 is turned on, power is supplied to a heater 114 mounted on the reservoir 116 membrane. The membrane is heated to a suitable temperature which allows gas to permeate through the membrane into the laser block 100. In a preferred embodiment, the membrane is heated to 600° C. to allow helium and neon to permeate therethrough. The voltage comparator receives pressure signals 108 from the pressure sensor 102 while replenishment of lasing gas occurs. Once the proper pressure level for laser block 100 is restored, the voltage comparator turns off the switch 112 to remove heater 114 power.

Figure 6:
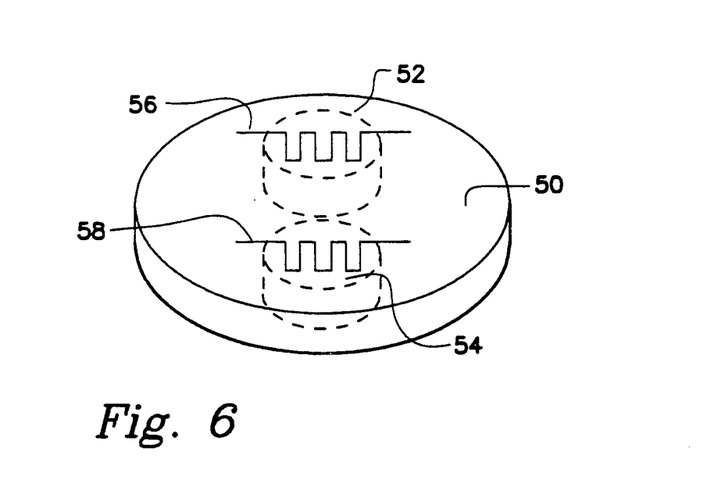
FIG. 6 is an isometric view of a platinum heating element deposited on a selectively permeable membrane together with a platinum heating element formed on a pressure responsive membrane, where each of the membranes are fabricated on a common silicon substrate.

FIG. 6 shows a silicon substrate 50 on which is formed a selectively permeable membrane 52 and a pressure responsive membrane 54, where the selectively permeable membrane 52 is part of a life extending gas capsule and the pressure responsive membrane is part of a piezoelectric pressure sensor. The design shown in FIG. 6 permits the pressure sensing and the gas admitting to be performed at the same cavity in the gyro block which is open to the triangular tunnel. Platinum elements 56 and 58 are formed across each of the membranes 52 and 54, respectively. An advantage of the design shown in FIG. 6 is that the membranes 52 and 54 and the platinum elements 56 and 58 can be formed during the same processing steps.

Figure 7:
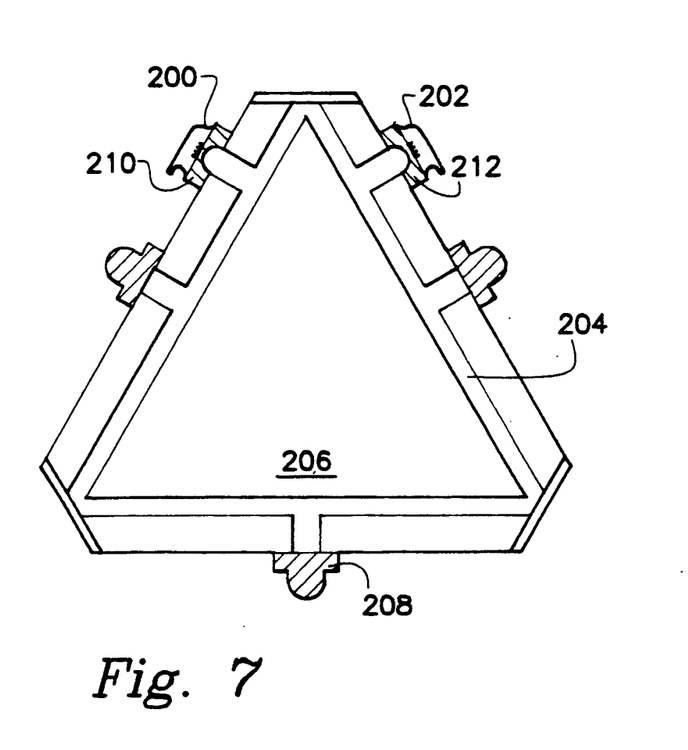
FIG. 7 is a plan view of a ring laser gyroscope in accordance with the second embodiment of the invention where life extending gas capsules are designed to permit continuous, uncontrolled diffusion of lasing gas into the gyroscope.

FIG. 7 shows a second embodiment of the invention wherein neon and helium gases continuously diffuse from gas capsules 200 and 202, respectively, into the triangular tunnel 204 in ring laser gyroscope 206. Diffusion through membranes 210 and 212 is uncontrolled, i.e., no servo loop is required, and occurs at rates which are equivalent to the average rate of cleanup by cathode 208 in an operating environment. To achieve a permeation rate equivalent to the gas clean up rate, the dimensions and composition of membranes 210 and 212 must be precisely controlled. The permeation rated is given by the following equation:

$$q = K(A/d)\Delta P$$

where
q = the permeation rate in $cm^3 gas(NTP)/sec$
K = the permeation constant expressed as $cm^3 gas(NTP)*mm/sec*cm^2*cm\ Hg$
A = diaphragm area, $cm^2$
d = diaphragm thickness, mm
$\Delta P$ = pressure differential across the diaphragm, cm Hg A typical cleanup rate for neon in a small laser gyroscope is on the order of $$q_{Ne} = 1*10^{-11}\ cm^3\ Ne\ (NTP)/sec.$$

FIG. 3 shows the neon permeation constant at room temperature for fused silica ($SiO_2$) is $$K_{Ne} = 1.5*10^{-14}\ cm^3\ (NTP)*mm/sec*cm^2*cm\ Hg.$$

When capsule 200 has a 100 cm Hg neon gas fill, a 400 micron*400 micron membrane 210 which is 2.5 microns thick will give the desired leak rate. In the same manner as described above, the helium gas capsule 202 will be filled to an appropriate gas pressure and have controlled membrane 212 dimensions: that allow replenishment of helium gas at a :.ate equal to the average rate of clean up by cathode 208. As discussed above, the composition of membranes 210 and 212 can be modified by techniques well known in the silicon industry to adjust permeability, i.e., implanting and thermally diffusing glass formers such as Al, Ca, Mg, Na or K, etc. It is also contemplated that a single gas capsule could be used instead of the two shown in FIG. 7 where the composition of the helium and neon gas mixture as well as the membrane composition and dimensions will b controlled to accommodate the different permeation rates of helium and neon gas.

While the invention has been described in terms of a preferred embodiment which includes the controlled diffusion of lasing gas through a membrane of a gas capsule into a polygonal tunnel of a ring laser gyroscope and several alternate embodiments, those skilled in the art will recognize the invention can be practiced in other environments within the spirit and scope of the appended claims. Moreover, those skilled in the art will recognize that the teachings of the invention may be used with similar advantage in gas lasers and other gas discharge devices requiring replenishment of gas.

The embodiments of an invention in which an exclusive property or right is claimed are defined as follows:
1. A gas discharge device comprising:
   a block having a gas containing cavity filled with a gas under a first pressure for sustaining a discharge;
   a gas capsule means having a housing and a gas exit port, said gas capsule means further comprising a valve means positioned between said gas exit port and a gas reservoir portion, said gas capsule means being permanently attached to said block and having said gas exit port in communication with said gas containing cavity of said block, said gas reservoir portion containing said gas for sustaining said discharge, said reservoir gas being at a second pressure which is higher than said gas at said first pressure in said gas containing cavity of said block;
   said valve means operative for admitting said gas from said gas reservoir portion into said gas containing cavity of said block;
   a piezoresistive pressure sensor in communication with said first pressure in said cavity; and
   a servo control responsive to an output from said pressure sensor for controlling said valve means to admit gas from said gas reservoir into said cavity.
2. The gas discharge device recited in claim 1 wherein said valve means comprises:
   a silicon nitride membrane characterized by a temperature dependent permeability; and a heater positioned in a heat transfer relationship with said membrane for controlling the permeability of said membrane.

3. The gas discharge device recited in claim 2 wherein a glass forming agent has been implanted and thermally diffused in said silicon nitride to modify the permeability of said silicon nitride.

4. The gas discharge device recited in claim 2 wherein said membrane is silicon dioxide.

5. The gas discharge device recited in claim 4 wherein a glass forming agent has been implanted and thermally diffused in said silicon dioxide to modify the permeability of said silicon dioxide.

6. The gas discharge device recited in claim 2 wherein said heater is a platinum resistive element deposited on said membrane.

7. The gas discharge device recited in claim 1 wherein said valve means comprises a membrane having a controlled composition and dimensions selected so that said gas under said second pressure in said reservoir continuously diffuses through said membrane into said gas containing cavity at a prescribed rate.

8. The gas discharge device recited in claim 7 wherein said prescribed rate is equivalent to the average rate of clean up of said gas by a cathode positioned in said gas containing cavity.

9. The gas discharge device recited in claim 7 wherein said membrane is silicon nitride.

10. The gas discharge device recited in claim 9 wherein a glass forming agent has been implanted and thermally diffused in said silicon nitride to modify the permeability of said silicon nitride.

11. The gas discharge device recited in claim 7 wherein said membrane is silicon dioxide.

12. The gas discharge device as recited in claim 11 wherein a glass forming agent has been implanted and thermally diffused in said silicon dioxide to modify the permeability of said silicon dioxide.

13. The gas discharge device recited in claim 7 wherein said membrane is soda lime glass.

14. The gas discharge device recited in claim 1 wherein said valve means comprises a membrane formed in a silicon substrate wherein said membrane is characterized by a temperature dependent permeability and, further comprising:
- a heater positioned in a heat transfer relationship with said membrane for controlling the permeability of said membrane;
- a piezoresistive pressure sensor formed on said silicon substrate adjacent said membrane; and
- a servo control electrically connected to said heater and said piezoresistive pressure sensor, said membrane and said piezoresistive pressure sensor being commonly connected to said gas containing cavity, whereby said pressure sensor senses said first pressure in said gas containing cavity, said servo control responds to an output from said piezoresistive pressure sensor by supplying current to said heater when said gas under said first pressure in said gas containing cavity drops below a threshold value thereby permitting said gas in said gas reservoir portion at said second, higher pressure to permeate therethrough into said gas containing cavity of said block.

15. A gas laser comprising:
- a laser block having a gas containing cavity filled with a gas under a first pressure for sustaining a discharge;
- an anode and a cathode in communication with said cavity for establishing a discharge;
- mirrors at ends of said cavity for reflecting lasing light from said discharge;
- a gas capsule means having a housing and a gas exit port, said gas capsule means further comprising a valve means positioned between said gas exit port and a gas reservoir portion, said gas capsule means being permanently attached to said block and having said gas exit port in communication with said gas containing cavity of said block, said gas reservoir portion containing said gas for sustaining said discharge, said gas reservoir being at a second pressure which is higher than said gas at said first pressure in said gas containing cavity of said block;
- said valve means operative for admitting said gas from said gas reservoir portion into said gas containing cavity of said block;
- a piezoresistive pressure sensor in communication with said first pressure in said cavity; and
- a servo control responsive to an output from said pressure sensor for controlling said valve means to admit gas from said gas reservoir into said cavity.

16. The gas laser recited in claim 15 wherein said valve means comprises:
- a silicon nitride membrane characterized by a temperature dependent permeability; and
- a heater positioned in a heat transfer relationship with said membrane for controlling the permeability of said membrane.

17. The gas laser recited in claim 16 wherein a glass forming agent has been implanted and thermally diffused in said silicon nitride to modify the permeability of said silicon nitride.

18. The gas laser recited in claim 16 wherein said membrane is silicon dioxide.

19. The gas laser recited in claim 18 wherein a glass forming agent has been implanted and thermally diffused in said silicon dioxide to modify the permeability of said silicon dioxide.

20. The gas laser recited in claim 16 wherein said heater is a platinum resistive element deposited on said membrane.

21. The gas laser recited in claim 15 wherein said valve means comprises a membrane having a controlled composition and dimensions selected so that said gas under said second pressure in said reservoir continuously diffuses through said membrane into said gas containing cavity at a prescribed rate.

22. The gas laser recited in claim 21 wherein said prescribed rate is equivalent to the average rate of clean up of said gas by said cathode in said gas containing cavity.

23. The gas laser recited in claim 21 wherein said membrane is silicon nitride.

24. The gas laser recited in claim 23 wherein a glass forming agent ha been implanted and thermally diffused in said silicon nitride to modify the permeability of said silicon nitride.

25. The gas laser recited in claim 21 wherein said membrane is silicon dioxide.

26. The gas laser recited in claim 25 wherein a glass forming agent has been implanted and thermally diffused in said silicon dioxide to modify the permeability of said silicon dioxide.

27. The gas laser recited in claim 21 wherein said membrane is soda lime glass.

28. The gas laser recited in claim 15 wherein said valve means comprises a membrane formed in a silicon substrate wherein said membrane is characterized by a temperature dependent permeability and, further comprising:

a heater positioned in a heat transfer relationship with said membrane for controlling the permeability of said membrane;

a piezoresistive pressure sensor formed on said silicon substrate adjacent said membrane; and a servo control electrically connected to said heater and said piezoresistive pressure sensor, said membrane and said piezoresistive pressure sensor being commonly connected to said gas containing cavity, whereby said pressure sensor senses said first pressure in said gas containing cavity, said servo control responds to an output from said piezoresistive pressure sensor by supplying current to said heater when said gas under said first pressure in said gas containing cavity drops below a threshold value thereby permitting said gas in said gas reservoir portion at said second, higher pressure to permeate therethrough into said gas containing cavity.

29. A ring laser gyroscope comprising:

a laser block having a polygonal cavity of limited capacity filled with a gas under a first pressure for sustaining a discharge;

first and second anodes and a cathode in communication with said polygonal cavity for establishing counter-rotating discharges in said cavity;

mirrors at apices of said polygonal cavity for reflecting lasing light from said discharge;

a gas capsule means having a housing and a gas exit port, said gas capsule means further comprising a valve means positioned between said gas exit port and a gas reservoir portion, said gas capsule means being permanently attached to said block and having said gas exit port in communication with said gas containing cavity of said block, said gas reservoir portion containing said gas for sustaining said discharge, said reservoir gas being at a second pressure which is higher than said gas at said first pressure in said gas containing cavity of said block;

said valve means operative for admitting said gas from said gas reservoir portion into said gas containing cavity of said block; and a piezoresistive pressure sensor in communication with said first pressure in said cavity; and a servo control responsive to an output from said pressure sensor for controlling said valve means to admit gas from said gas reservoir into said cavity;

a piezoresistive pressure sensor connected to said polygonal cavity for sensing said first pressure in said cavity; and a servo control responsive to an output from said pressure sensor for controlling said valve to admit gas from said reservoir into said cavity.

30. The ring laser gyroscope recited in claim 29 wherein said valve comprises:

a silicon nitride membrane characterized by a temperature dependent permeability; and a heater positioned in a heat transfer relationship with said membrane for controlling the permeability of said membrane.

31. The ring laser gyroscope recited in claim 30 wherein a glass forming agent has been implanted and thermally diffused in said silicon nitride to modify the permeability of said silicon nitride.

32. The ring laser gyroscope recited in claim 30 wherein said membrane is silicon dioxide.

33. The ring laser gyroscope recited in claim 32 wherein a glass forming agent has been implanted and thermally diffused in said silicon dioxide to modify the permeability of said silicon dioxide.

34. The ring laser gyroscope recited in claim 30 wherein said heater is a platinum resistive element deposited on said membrane.

35. The ring laser gyroscope recited in claim 29 wherein said valve comprises a membrane having a controlled composition and dimensions selected so that said gas under said second pressure in said reservoir continuously diffuses through said membrane into said polygonal cavity at a prescribed rate.

36. The ring laser gyroscope recited in claim 35 wherein said prescribed rate is equivalent to the average rate of clean up of said gas by said cathode in said polygonal cavity.

37. The ring laser gyroscope recited in claim 35 wherein said membrane is silicon nitride.

38. The ring laser gyroscope recited in claim 37 wherein a glass forming agent has been implanted and thermally diffused in said silicon nitride to modify the permeability of said silicon nitride.

39. The ring laser gyroscope recited in claim 35 wherein said membrane is silicon dioxide.

40. The ring laser gyroscope recited in claim 39 wherein a glass forming agent has been implanted and thermally diffused in said silicon dioxide to modify the permeability of said silicon dioxide.

41. The ring laser gyroscope recited in claim 35 wherein said membrane is soda lime glass.

42. The ring laser gyroscope recited in claim 29 wherein said valve comprises a membrane formed in a silicon substrate wherein said membrane is characterized by a temperature dependent permeability and, further comprising:

a hater positioned in a heat transfer relationship with said membrane for controlling the permeability of said membrane;

a piezoresistive pressure sensor formed on said silicon substrate adjacent said membrane; and a servo control electrically connected to said heater and said piezoresistive pressure sensor, said membrane and said piezoresistive pressure sensor being commonly connected to said polygonal cavity, whereby said pressure sensor senses said first pressure in said polygonal cavity, said servo control responds to an output from said piezoresistive pressure sensor by supplying current to said heater when said gas under said first pressure in said polygonal cavity drops below a threshold value thereby permitting said gas in said gas reservoir portion at said second, higher pressure to permeate therethrough into said polygonal cavity.

* * * * *

UNITED STATES PATENT AND TRADEMARK OFFICE
CERTIFICATE OF CORRECTION

PATENT NO. : 5,127,016
DATED : June 30, 1992
INVENTOR(S) : Theodore J. Podgorski It is certified that error appears in the above-identified patent and that said Letters Patent is hereby corrected as shown below:

Column 10, Line 45, delete "hater" and insert --heater--.

Signed and Sealed this

Twenty-eighth Day of September, 1993

Attest:

BRUCE LEHMAN

*Attesting Officer*          *Commissioner of Patents and Trademarks*